United States Patent [19]
König et al.

[11] 4,338,431
[45] Jul. 6, 1982

[54] PROCESS FOR THE PREPARATION OF NEOPENTYL GLYCOL POLYESTERS AND CO-POLYESTERS

[75] Inventors: Klaus König, Leverkusen; Wolfgang Reichmann, Duesseldorf; Manfred Schönfelder, Leverkusen, all of Fed. Rep. of Germany

[73] Assignee: Bayer Aktiengesellschaft, Leverkusen, Fed. Rep. of Germany

[21] Appl. No.: 122,149

[22] Filed: Feb. 15, 1980

[30] Foreign Application Priority Data

Mar. 1, 1979 [DE] Fed. Rep. of Germany ....... 2907952

[51] Int. Cl.$^3$ ............................................ C08G 63/22
[52] U.S. Cl. .................................. 528/272; 528/274; 560/76; 560/98; 560/127
[58] Field of Search ................ 528/272, 274; 560/127, 560/76, 98

[56] References Cited

U.S. PATENT DOCUMENTS

| 3,055,869 | 9/1962 | Wilson et al. | 528/272 |
| 3,330,789 | 7/1967 | Aylesworth et al. | 260/22 |
| 4,101,422 | 7/1978 | Lamont et al. | 260/84 |
| 4,148,764 | 4/1979 | Lamont et al. | 260/22 |
| 4,152,512 | 5/1979 | Downs | 528/272 |

FOREIGN PATENT DOCUMENTS 2390460 8/1978 France .
1029136 5/1966 United Kingdom ..

Primary Examiner—Lucille M. Phynes
Attorney, Agent, or Firm—Gene Harsh; Lawrence S. Pope; Thomas W. Roy

[57] ABSTRACT

The present invention relates to an improved process for the preparation of neopentyl glycol polyesters by reacting neopentyl glycol with carboxylic acids or derivatives thereof in the presence of minor amounts of glycols which boil at lower temperatures than neopentyl glycol. These low-boiling glycols obviate previous difficulties relating to the sublimation of neopentyl glycol. Thus, the present process offers safety advantages since neopentyl glycol does not crystallize in the reaction apparatus and also provides better control over the molecular ratio of acid groups to alcohol groups.

11 Claims, No Drawings

PROCESS FOR THE PREPARATION OF NEOPENTYL GLYCOL POLYESTERS AND CO-POLYESTERS

BACKGROUND OF THE INVENTION

1. Field of the Invention

This application relates to an improved process for the preparation of neopentyl glycol polyesters and co-polyesters preferably having average molecular weights in the range of from about 400 to 6,000.

2. Description of the Prior Art

Neopentyl glycol polyesters and co-polyesters are known. Polyurethanes produced from them are distinguished by their optimum mechanical properties such as advantageous cold characteristics and exceptional resistance to hydrolysis, which are important, for example, in coatings of all types.

Neopentyl glycol polyesters and co-polyesters are normally prepared by the solvent-free esterification of (a) polyvalent and optionally also monovalent, preferably divalent carboxylic acids on their anhydrides or esters with low-boiling monohydric alcohols: (b) neopentyl glycol; and optionally (c) additional polyhydric alcohols, in particular higher boiling diols (Houben-Weyl, *Methoden der Organischen* Chemie, Volume 14/2, page 1 et seq, 1963). In such solvent-free esterification processes, the major portion of the water of condensation or of the monohydric alcohol is first distilled off after the starting components have been mixed, and esterification is then completed under vacuum, with removal of the remainder of the water of condensation or monohydric alcohol. It is well known that when the process is used for the preparation of neopentyl glycol polyesters or co-polyesters, technical difficulties arise at this stage, due to the physical properties of neopentyl glycol, since it has a melting point of about 127° C. and a boiling point at atmospheric pressure of about 208° C., but at pressures below 50 mbar, neopentyl glycol boils in the region of, or below, its melting point, i.e., it sublimes. Since the temperature in the reaction vessel during the vacuum phase of the preparation of neopentyl glycol polyesters is approximately from 200° to 220° C., it is found that even at a comparatively slight vacuum neopentyl glycol enters the column in considerable quantities and immediately crystallizes there. This phenomenon leads to several problems. Firstly, esterification is accompanied by an uncontrolled lowering of the concentration of neopentyl glycol in the reaction vessel due to sublimation losses. This cause an undesirable change in the prescribed molar ratio of acid to alcohol groups. In the course of condensation, part of the sublimating neopentyl glycol is deposited in those parts of the apparatus where it is liable to cause blockages, so that the preparation of neopentyl glycol polyesters is also a problem from a safety point of view. Added to this are the problems of environmental contamination, in particular, the contamination of effluent by neopentyl glycol.

It is known that substantial quantities of glycols which have a higher boiling point than neopentyl glycol may be used in the preparation of neopentyl glycol polyesters without impairing the properties of the synthetic materials produced from the polyesters. Co-polyesters of, for example, adipic acid, neopentyl glycol and hexanediol are therefore particularly important. If, however, substantial quantities of lower boiling glycols are used (e.g., ethylene glycol), there is an undesirable loss in the resistance to hydrolysis of the end products.

It was therefore an object of the present invention to provide a process which could easily be carried out for the preparation of neopentyl glycol polyesters and co-polyesters preferably having average molecular weights of from about 400 to 6,000 without the abovementioned disadvantages of the known art.

This problem could surprisingly be solved by using certain low-boiling glycols described in more detail below at certain concentrations described below in the preparation of neopentyl glycol polyesters and co-polyesters.

SUMMARY OF THE INVENTION

The present invention relates to a process for the preparation of neopentyl glycol polyesters and co-polyesters by the reaction of:
(a) carboxylic acids, their anhydrides and/or their esters with monohydric alcohols with
(b) neopentyl glycol and, optionally, other glycols boiling at higher temperatures than neopentyl glycol, wherein neopentyl glycol is present in an amount between 20 and 100%, preferably between 50 and 100% by weight, based on the total weight of component (b), accompanied by removal of the water of condensation or of the monohydric alcohol, characterized in that the reaction is carried out in the presence of a glycol preferably having 2 or 3 carbon atoms which boils at a lower temperature than neopentyl glycol, the lower boiling glycol being used in quantities of from about 0.1–3% by weight, preferably from 0.2–1% by weight, based on the polyester.

DETAILED DESCRIPTION OF THE INVENTION

The starting materials for the process according to the present invention include monobasic and/or polybasic, preferably dibasic carboxylic acids or anhydrides derived therefrom or esters of such carboxylic acids with monohydric alcohols boiling at a lower temperature then neopentyl glycol, e.g., 2-ethyl hexanoic acid, oleic acid, phthalic acid anhydride, dimethyl terephthalate, isophthalic acid, trimellitic acid anhydride, maleic acid anhydride, tetrahydrophthalic acid, hexahydrophthalic acid dimethyl ester, succinic acid, adipic acid, acelaic acid, suberic acid, sebacic acid and dodecane diacid. Adipic acid is preferably used.

Higher boiling diols such as the following are used in addition to neopentyl glycol in the preparation of neopentyl glycol co-polyesters: hexanediol, diethylene glycol, triethylene glycol, and dipropylene glycol. These polyesters are preferably mixed with hexanediol-(1,6). In addition, polyhydric alcohols such as glycerol, trimethylol propane, pentaerythritol or sorbitol may be added as branching components.

The following are examples of glycols having lower boiling points than neopentyl glycol which may be used in the process according to the present invention: ethylene glycol, propylene glycol-(1,2) and propylene glycol-(1,3). Ethylene glycol is preferred.

As already described above, losses of neopentyl glycol due to sublimation occur in the preparation of neopentyl glycol polyesters and co-polyesters by the known processes of the art. This entails the disadvantages already mentioned. These disadvantages are unexpectedly obviated by the addition of the lower boiling glycols at the concentrations mentioned above. Due to the small quantities in which these glycols are added according to the present invention, the properties of synthetic materials produced from such neopentyl glycol polyesters and co-polyesters are not adversely affected.

The process according to the present invention thus opens up for the future the possibility of wider technical use of neopentyl glycol polyesters.

The process according to the present invention is carried out at the conventional temperatures (preferably in the region of from about 150° to 220° C.) and conventional pressures (from atmospheric pressure to about 5 mbar) used for the preparation of polyesters. The usual esterification catalysts such as tin or titanium compounds, for example, tin (II) chloride or titanium tetrabutylate, may be used if desired.

The process according to the present invention is preferably carried out as follows:

The esterification components together with the glycols used according to the present invention, which have a lower boiling point than neopentyl glycol, are introduced into a suitable reaction vessel under nitrogen. This reaction vessel is equipped with a distillation column with a cooling device attached to remove the water of condensation or monohydric alcohol formed in the preparation of the polyester. The reaction mixture is then heated with stirring, the temperature being raised to about 200° to 220° C. as the water or monohydric alcohol is progressively removed. It is not advisable to increase the temperature above this range due to the risk of discoloration of the reaction product. When the bulk of the water or monohydric alcohol has been removed, the pressure in the reaction vessel is reduced. The catalyst is generally added at this stage. Esterification is completed under continuous reduction of pressure down to a final pressure of about 200–5 mbar (depending on the average molecular weight), so that the residues of water or monohydric alcohol escape. The total time required for preparation of the polyester is from about 20 to 50 hours. The process according to the present invention may be carried out batchwise or continuously using the methods known in the art.

The neopentyl glycol polyesters and co-polyesters prepared by the process according to the present invention may be used as starting materials for numerous synthetic products, for example, for the production of polyester resins, polyurethane foams, adhesives, PUR thermoplasts, lacquers and coatings of all kinds. In addition to good cold characteristics, they impart to these materials exceptional resistance to hydrolysis and resistance to light and heat.

The examples given below serve to illustrate the present invention. All percentages given are percentages by weight unless otherwise indicated.

EXAMPLE 1

An apparatus customarily used for solvent-free esterification, consisting of a reaction vessel, column and attached condenser, was rinsed with nitrogen. 44.57 kg of adipic acid and 48.91 kg of neopentyl glycol were then introduced with the addition of 0.5 kg of ethylene glycol (0.6% based on the polyester). The reaction mixture was heated to 200° C. at atmospheric pressure, during which operation most of the water of condensation was distilled off. Condensation was then completed with removal of the remaining water at the same temperature and at reduced pressure (down to 120 mbar) in the presence of 2 g of tin (II) chloride as a catalyst. The total esterification time was 25 hours. The polyester had a hydroxyl number of 224 ($\eta$ 25° C.=2,700 mPa.s).

COMPARISON EXAMPLE

Solvent-free esterification was carried out using the same starting components as in Example 1 and under the same conditions but without the addition of ethylene glycol. Heavy deposits of neopentyl glycol were formed in the column and particularly at the head of the column, and a large proportion of the neopentyl glycol also escaped with the water of condensation into the receiver provided for the latter. At the end of the esterification, the hydroxyl number of the polyester was not within the desired range, but was 157.

EXAMPLE 2

Using a procedure analogous to that described in Example 1, 4,599 g of adipic acid were esterified with 4,056 g of neopentyl glycol with the addition of 50 g of ethylene glycol (0.7%, based on the polyester) within 30 hours, first at atmospheric pressure up to 200° C. and then, in the presence of 200 mp of tin (II) chloride as a catalyst, at a reduced pressure (down to 20 mbar). The hydroxyl number of the polyester was 112 ($\eta$ 25° C.=6,900 mPa.s).

EXAMPLE 3

5,190 g of adipic acid were reacted with 3,098 g of hexane diol-(1,6) and 1,487 g of neopentyl glycol with the addition of 90 g of propylene glycol-(1,2) (1%, based on the polyester) using a procedure analogous to that described in Example 1. Esterification was completed after 30 hours. The hydroxyl number was 66 ($\eta$ 75° C.=400 mPa.s).

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of neopentyl glycol polyesters and co-polyesters which comprises reacting:
   (a) carboxylic acids, their anyhydrides or their esters with monohydric alcohols; with
   (b) neopentyl glycol and, optionally, other glycols boiling at higher temperatures than neopentyl glycol, wherein neopentyl glycol is present in an amount between 20 and 100% by weight based on the total weight of neopentyl glycol and the higher boiling glycols,
accompanied by removal of the water of condensation or of the monohydric alcohol, characterized in that the reaction is carried out in the presence of from about 0.1–3% by weight, based on the polyester, of a glycol boiling at lower temperatures than neopentyl glycol.

2. The process according to claim 1, characterized in that the amount of neopentyl glycol is between 50 and 100% by weight, based on the total weight of component (b).

3. The process according to claim 1 or claim 2, characterized in that from about 0.2–1% by weight, based on the polyester, of the low-boiling glycol is used.

4. The process according to claim 1 or claim 2, characterized in that the low-boiling glycol used is ethylene glycol.

5. The process according to claim 1, characterized in that the reaction is carried out at a temperature between about 150° to 220° C.

6. The process according to claim 1, characterized in that the reaction is carried out at a pressure between about 5 to 1000 mbar.

7. The process according to claim 1, characterized in that the glycol boiling at lower temperatures than neopentyl glycol has 2-3 carbon atoms.

8. A process for the preparation of neopentyl glycol polyesters and co-polyesters which comprises reacting:
  (a) an acid component exclusively selected from the group consisting of 2-ethyl hexanoic acid, oleic acid, phthalic acid anhydride, dimethyl terephthalate, isophthalic acid, trimellitic acid anhydride, maleic acid anhydride, tetrahydrophthalic acid, hexahydrophthalic acid dimethyl ester, succinic acid, adipic acid, azelaic acid, suberic acid, sebacic acid, dodecane diacid, anhydrides of these acids or esters of these acids with monohydric alcohols; with
  (b) neopentyl glycol and, optionally, other glycols boiling at higher temperatures than neopentyl glycol, wherein neopentyl glycol is present in an amount between 20 and 100% by weight based on the total weight of neopentyl glycol and the higher boiling glycols,
accompanied by removal of the water of condensation or of the monohydric alcohol, characterized in that the reaction is carried out in the presence of from about 0.1-3% by weight, based on the polyester, of a glycol boiling at lower temperatures than neopentyl glycol.

9. The process of claim 8, wherein said acid component is selected from the group consisting of 2-ethyl hexanoic acid, phthalic acid, terephthalic acid, isophthalic acid, tetrahydrophthalic acid, hexahydrophthalic acid, adipic, dodecane diacid, anhydrides of these acids or esters of these acids with monohydric alcohols.

10. The process of claim 8, wherein said acid component consists of adipic acid, adipic acid anhydride or esters of adipic acid with monohydric alcohols.

11. The process of claim 1 or 8, wherein said glycol boiling at lower temperatures than neopentyl glycol consists of ethylene glycol.

* * * * *